:::::::::::::::::::::::::::::::::::::::::::::::::::::::::::::::::::::::::::::

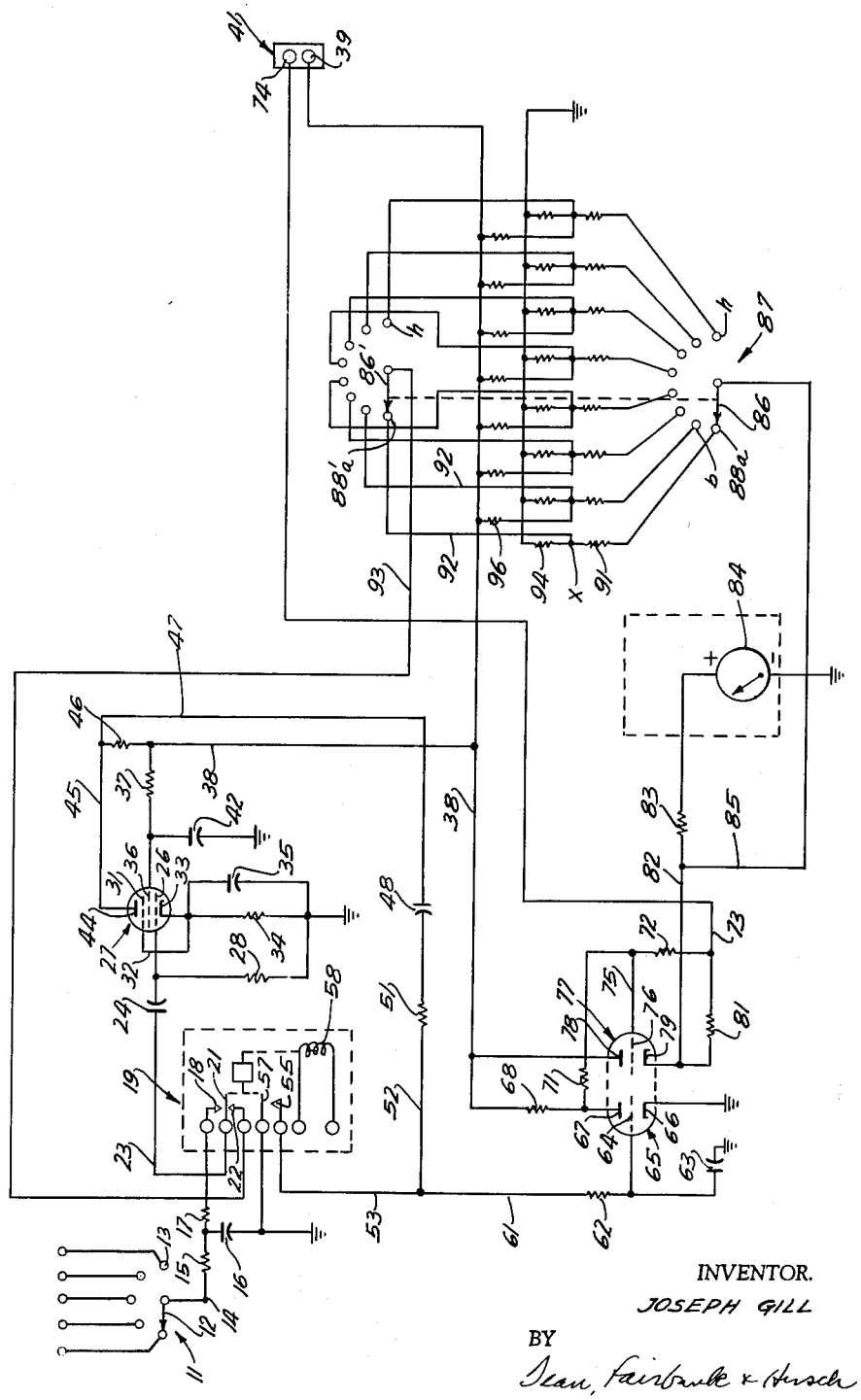

United States Patent Office 2,989,701
Patented June 20, 1961

2,989,701
MONITORING EQUIPMENT
Joseph Gill, Hicksville, N.Y., assignor, by mesne assignments, to Hagan Chemicals & Controls, Inc., Pittsburgh, Pa., a corporation of Pennsylvania
Filed Nov. 26, 1957, Ser. No. 698,986
3 Claims. (Cl. 324—115)

This invention relates to the art of monitoring equipment and more particularly to a meter system that will give an accurate indication of the value of a condition being measured.

As conducive to an understanding of the invention, it is to be noted that where a wide range of conditions are to be indicated on a meter, resolution and accuracy of reading may be poor. In addition, where the meter error is a percentage of full scale, any indicated position on the scale might have the same absolute error and this is especially serious where the indicated value is only a small portion of the total scale.

Where the value of a condition being monitored is initially determined by a suitable transducer which has an output that is non-linear with respect to changes of the value of such condition, if in order to accurately indicate such values on a meter, differently calibrated dials are used, they are relatively difficult to read and resolution and accuracy is poor.

It is accordingly among the objects of the invention to provide a meter type monitoring system that is relatively simple in construction having relatively few parts that are not likely to become out of order, that will provide a high degree of resolution and accuracy of reading of the indicated value on the meter with a minimum effect of the meter error even on readings of relatively small value, and which will permit use of a single linearly calibrated dial to provide accurate readings of even non-linear outputs.

According to the invention, by means of a suitable feed back network, given increments of input signal voltage may be cancelled out so that the maximum remaining signal voltage will be no greater than the range of the meter for the value of the condition corresponding to such remaining signal voltage. In addition, for each range of the condition being monitored, the feed back network is of such value as to adjust the gain of the system so that a given output voltage will be provided to effect full scale indication of the meter.

In the accompanying drawings in which are shown one or more of various possible embodiments of the several features of the invention, the single figure is a circuit diagram of the system.

Referring now to the drawings, the equipment diagrammatically shown, comprises a selector switch 11, the movable contact arm 12 of which may engage any one of a plurality of fixed contacts 13 to each of which is connected a transducer (not shown) which illustratively may be temperature responsive device having an output voltage proportional to temperature.

The contact arm 12 is connected to input terminal 14 which is connected through a low-pass filter comprising resistor 15 and capacitor 16 to ground and through isolation resistor 17 to fixed contact 18 of chopper 19. The contact arm 21 of chopper 19 which is normally spaced from said fixed contact 18 and associated fixed contact 22, is connected by lead 23 through coupling capacitor 24 to the control grid 26 of amplifier tube 27, said grid 26 being returned to ground through resistor 28.

The suppresser grid 31 of tube 27 is connected by lead 32 to the cathode 33 which is connected through biasing resistor 34 to ground, said resistor 34 being by-passed by capacitor 35 to prevent cathode degeneration. The screen grid 36 of tube 27 is connected through resistor 37 to B+ lead 38 which is connected to terminal 39 on terminal strip 41 and said resistor 37 is by-passed by capacitor 42 to prevent screen-grid degeneration.

The plate 44 of tube 27 is connected by lead 45 through plate load resistor 46 to B+ lead 38 and the output of tube 27 is fed from plate 44, through leads 45 and 47, coupling capacitor 48, which prevents static D.C. from appearing at the chopper contacts, resistor 51, which improves the rectification action, leads 52 and 53 to fixed contact 55 of chopper 19.

Associated with fixed contact 55 and spaced therefrom is a contact arm 57 ganged with contact arm 21 and actuated by the coil 58 of the chopper so as to vibrate illustratively at a frequency of 60 cycles per second. The contact arm 57 is connected to ground so that the signal from plate 44 of tube 27 is successively grounded.

This rectifies the pulses from tube 27 and clamps them to ground. The rectified signal passes through lead 61, resistor 62 and capacitor 63 to filter the pulsating D.C. signal to provide at the control grid 64 of amplifier tube 65 a smooth D.C. signal proportional to the output from the transducer.

The cathode 66 of tube 65 is connected to ground and the plate 67 is connected through plate load resistor 68 to B+ lead 38 and through resistors 71 and 72 which act as a voltage divider to lead 73 which is connected to terminal 74 on strip 41 which in turn is connected to −300 volts. The amplified signal from tube 65 is fed through resistor 71 and lead 75 to the grid 76 of cathode follower tube 77, the voltage divider 71 and 72 serving to provide proper bias for tube 77.

The plate 78 of tube 77 is connected to B+ lead 38 and the cathode 79 is connected through cathode bias resistor 81 to lead 73 and by lead 82 through resistor 83 to one side of meter 84, the other side of which is connected to ground, the resistor 83 limiting the current to the meter 84.

The cathode 79 is also connected by leads 82 and 85 to the movable contact arm 86 of range switch 87, which arm 86 successively engages fixed contacts 88a to h.

Each of the contacts 88a–h is connected to one end of a resistor 91, the other end of which defines a junction X that is connected by lead 92 to the associated fixed contact 88'a–h of switch 87 designed to be successively engaged by contact arm 86' ganged with arm 86 and connected by lead 93 to fixed contact 22 of chopper 19.

Each of the junctions X is connected to one end of a resistor 94, the other end of which is connected to ground and each of the junctions X associated with contacts 88b–h is also connected to one end of a resistor 96, the other end of which is connected to B+ lead 38.

In the operation of the equipment, the switch 11 is set to the position of the transducer whose output is to be measured. The output of the transducer which is a positive voltage proportional to the temperature of the condition being monitored, in the illustrative embodiment herein, is fed through low pass filter 15, 16, to remove noise and pickup and through resistor 17 to fixed contact 18 of the chopper 19, the resistor 17 preventing excessive current flow from capacitor 16 from injuring the chopper contacts.

As the chopper contact arm 21 is actuated, illustratively at the rate of 60 c.p.s., the D.C. signal applied to contact 18 will be interrupted and such interrupted D.C. will be applied through coupling capacitor 24 to the control grid 26 of amplifier tube 27, the capacitor 24 serving as a coupling device so that grid current will not flow through resistor 17 which would provide a false D.C. which in turn would be chopped.

Due to the capacitor 24, negative and positive pulses will be provided, the peak to peak value of which is proportional to the absolute value of the output signal, These pulses are amplified by tube 27 and such amplified signal is fed through leads 45, 47, capacitor 48, resistor 51, leads 52, 53 to fixed contact 55 of the chopper 19.

As the contact arm 57 of the chopper is also vibrated at a frequency of 60 c.p.s., and since the contact arm 57 is connected to ground, the positive pulses will be removed resulting in a rectification action which clamps the negative pulses to ground, the filter comprising resistor 62 and capacitor 63 filtering such pulses to provide smooth D.C. of amplitude proportional to the output from the transducer. This signal is applied to the grid 64 of D.C. amplifier tube 65 and the output of the tube is fed from plate 67 through voltage divider 71, 72 to the grid 76 of cathode follower 77.

The positive output from the cathode 79 of tube 77 is fed through lead 82, resistor 83 and meter 84 to ground. The output signal is also fed from cathode 79 through leads 82 and 85 to contact arm 86 of switch 87 which illustratively is engaging contact 88a. Hence, the signal will flow through resistors 91 and 94, which define the output resistance, to ground. The resistors 91 and 94 act as a voltage divider and the portion of the output signal across resistor 94 which defines a feed back resistor, is taken from junction X and fed through lead 92 to contact 88′a and thence from contact arm 86′, lead 93 to fixed contact 22 of the chopper 19.

Thus, a portion of the output signal is fed back to the chopper to be sampled alternately with the output from the transducer, i.e. the input signal.

The gain of the amplifiers 27 and 65 are sufficiently high so that the portion of the output signal developed across resistor 94, i.e., the feed back voltage, will be but slightly less than the input signal to the system so that the system will stabilize with a voltage across both resistors that will provide the desired full scale reading for an input voltage proportional to the maximum value of the first range determined by the position of switch 87 at contacts a.

The feed back thus stabilizes the system so that it is substantially independent of tube characteristics and voltage changes.

Assuming that at positions a, b and c of switch 87, the range is 0–100 degrees; 100–200 and 200–300 degrees and that the output of the temperature responsive transducer is a non-linear curve, i.e., for a temperature change from 0–100 degrees the signal voltage from the transducer is from 0–10 mv.; from 100–200 degrees, the signal voltage is from 10–21 mv. and from 200–300 degrees, the signal voltage is from 21–36 mv. and with each 100 degree interval the slope is linear. If not linear, of course smaller intervals can be used.

Assuming further that the meter at full scale has a reading of 100 degrees and requires 1 ma. therethrough to provide full scale indication.

If the ratio of the output resistors 91, 94 is such as to provide a gain of 1,000 for the system, with a 10 mv. input signal, the voltage across resistors 91, 94 will be 10 volts. If the value of resistor 83 plus the meter resistance is 10,000 ohms, 10 volts across the meter will provide the required 1 ma. for full scale indication with an input signal of 10 mv.

With resistors 91 and 94 having values of 9,990 ohms and 10 ohms respectively, at position a of switch 87, the ratio of the sum of resistors 91 and 94, i.e., 10,000 ohms to the value of resistor 94, i.e., 10 ohms, will provide the desired gain of 1,000 for full scale indication on the meter with the input signal of 10 mv. As 10 volts will appear across resistors 91 and 94, 1 ma. of current will flow therethrough and hence the voltage across resistor 94 will be 10 mv. This voltage is fed back to contact 22 to be alternatively sampled with the 10 mv. input signal from the transducer and in conventional manner the feed back will retain the voltage across resistors 91 and 94 at 10 volts with an input signal of 10 mv.

As the output from the transducer from 100–200 degree range is from 10 to 21 mv., in order that the meter be used it is necessary that the signal voltage due to the first 100 degrees, i.e., 10 mv. be neutralized and also that the gain of the system be changed so that 11 mv. from 100–200 degrees still provide full range deflection on the meter, i.e., it is necessary that the voltage across resistors 91 and 94 with a signal voltage of 11 mv. still be 10 volts.

To this end, the feed back network comprising resistors 91, 94 and 96 must cancel out 10 mv. of input signal and also must reduce the gain of the system to provide a 10 volt output with an 11 mv. input.

If feed back resistor 94 has a value of 11 ohms and resistor 91 a value of 9,989 ohms, the ratio therebetween will provide a gain of the system such that 11 mv. input signal will provide 10 volts output as desired.

In addition, as it is desired that only 11 mv. of the total input voltage of 21 mv. be considered, if the resistor 96 which is in series with resistor 94 which has a value of 11 ohms and the B+ source of 300 volts, has a value of 330K, then the voltage developed across resistor 94 will be 10 mv.

As a result, 10 mv. will be applied to contact 22 due to resistance 94 and 96 to neutralize a portion of the 21 mv. input signal from the transducer so that only 11 mv. will be amplified, for only 11 mv. will produce an interrupted D.C. through capacitor 24 and the feed back voltage from resistor 94 will retain the output at 10 volts across resistor 91, 94 for such an input.

It is apparent therefore that the meter reading of 100 degrees when added to the value of 100 degrees indicate at contact B of switch 87 will represent a temperature of 200 degrees.

Similarly with a transducer output of from 21–36 mv. over the range from 200–300 degrees, 21 mv. must be neutralized and the gain of the system adjusted so that the remaining 15 mv. will still provide a 10 volt output.

To this end, resistor 94 has a value of 15 ohms, and resistor 91 a value of 9,985 ohms so that the gain of the system is $$\frac{10,000}{15} = 6,667$$

to provide a 10 volt output with a 15 mv. input. To neutralize 21 mv. of the input signal, the value of resistor 96 in series with resistor 94 is 214.5K.

With the equipment above described, a high degree of resolution and accuracy is provided with a minimum effect of the meter error even in readings of relatively small value and a single linearly calibrated dial may be used to provide accurate readings of even non-linear signal voltages.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A monitoring system comprising means to convert direct current input signals, varying non-linearly over the total range of the condition to be monitored and varying substantially linearly with respect to given increments of such range, to interrupted direct current, means to amplify such interrupted direct current, means to rectify such amplified signal, a meter having a full scale range with a given output signal thereacross, means to feed such rectified signal to said meter, means for each given increment of such total range to neutralize given increments of input signal equal to the increment related to the maximum value of the signal for the prior increment and to adjust the gain of the system for each increment so that for the maximum value of remaining signal for such increment, such given output signal will be provided to effect full scale indication on the meter, said means comprising a plurality of feed back networks corresponding to each given increment of such range, each network having an output resistance, means to connect any one said networks into circuit to feed the output signal through said selected output resistance to develop an output voltage thereacross, a portion of said output resistance defining a feed back resistance, the ratio between the value of the output resistance and said portion of the output resistance determining the gain of the system, an additional resistance connected in series with said feed back resistance and a fixed source of potential, means to feed back the voltage developed across said feed back resistance due to the output signal thereacross and the current caused by said fixed source of potential, to oppose the input signal to effect such neutralization, whereby the signal to be amplified is the difference between the input signal and the feed back voltage.

2. The combination set forth in claim 1 in which said feedback resistance and said additional resistance in each network are of value such that for any selected network, after the first network corresponding to the first increment of the range, the voltage across the feed back resistance due to current therethrough caused by the fixed source of potential will neutralize that portion of the input signal corresponding to the maximum value of the previous increment of the range, and the system will have a gain for the maximum value of the increment corresponding to the selected network to provide a voltage across the output resistance to afford full scale indication on the meter.

3. The combination set forth in claim 1 in which the means to convert direct current input signals to interrupted direct current comprises a chopper having a pair of fixed contacts and a movable contact arm adapted alternately to engage said fixed contacts, the amplifier comprises a vacuum tube having a control grid and a plate, means to feed an input direct current signal to one of said fixed contacts, means connecting said contact arm to said control grid, a coupling capacitor in circuit between said contact arm and said control grid, the rectifying means rectifying the amplified signal from the plate of said vacuum tube, the means for each increment of the total range of the condition being monitored to neutralize given increments of input signal equal to the increment related to the maximum value of the signal for the prior range and to adjust the gain of the system is connected to the other fixed contact of said chopper, said last named means comprising a switch having a contact arm with an associated plurality of fixed contacts successively to be engaged by the contact arm, means to feed the rectified signal to said contact arm, said plurality of output resistances being connected respectively at one end to an associated fixed contact of said switch and at their other end to a return for current, a second switch having a contact arm ganged with said first contact arm and having an associated plurality of fixed contacts, means connecting said plurality of feed back resistances to an associated fixed contact of said second plurality, said second contact arm being connected to the other fixed contact of said chopper.

References Cited in the file of this patent

UNITED STATES PATENTS

| | | |
|---|---|---|
| 2,403,521 | Gilbert | July 9, 1946 |
| 2,413,389 | Smith | Dec. 31, 1946 |
| 2,459,730 | Williams | Jan. 18, 1949 |
| 2,648,015 | Greenfield | Aug. 4, 1953 |
| 2,736,861 | Duffy | Feb. 28, 1956 |
| 2,802,181 | Gorski | Aug. 6, 1957 |
| 2,824,286 | Burt | Feb. 18, 1958 |

FOREIGN PATENTS

| | | |
|---|---|---|
| 681,214 | Great Britain | Oct. 22, 1952 |